(12) United States Patent
Vitali et al.

(10) Patent No.: US 7,961,790 B2
(45) Date of Patent: Jun. 14, 2011

(54) METHOD FOR ENCODING/DECODING SIGNALS WITH MULTIPLE DESCRIPTIONS VECTOR AND MATRIX

(75) Inventors: Andrea Lorenzo Vitali, Bergamo (IT); Fabrizio Simone Rovati, Milan (IT); Luigi Della Torre, Milan (IT); Luca Celetto, Udine (IT)

(73) Assignee: STMicroelectronics S.r.L., Agrate Brianza (MI) (IT)

( * ) Notice: Subject to any disclaimer, the term of this patent is extended or adjusted under 35 U.S.C. 154(b) by 1328 days.

(21) Appl. No.: 11/084,531

(22) Filed: Mar. 18, 2005

(65) Prior Publication Data
US 2005/0207498 A1    Sep. 22, 2005

(30) Foreign Application Priority Data
Mar. 18, 2004   (EP) .................................... 04006490

(51) Int. Cl.
*H04N 7/12* (2006.01)
(52) U.S. Cl. ................................................. 375/240.24
(58) Field of Classification Search .............. 375/240.24
See application file for complete search history.

(56) References Cited

U.S. PATENT DOCUMENTS

| | | | | |
|---|---|---|---|---|
| 5,280,540 A | * | 1/1994 | Addeo et al. ................ | 348/14.1 |
| 6,012,159 A | * | 1/2000 | Fischer et al. ............... | 714/755 |
| 6,289,173 B1 | * | 9/2001 | Miyashita et al. ........... | 386/111 |
| 6,345,125 B2 | | 2/2002 | Goyal et al. ................. | 382/251 |
| 2002/0116715 A1 | | 8/2002 | Apostolopoulos ............ | 725/85 |
| 2003/0076907 A1 | | 4/2003 | Harris ........................... | 375/350 |
| 2003/0095203 A1 | * | 5/2003 | MacInnis et al. ............. | 348/441 |

FOREIGN PATENT DOCUMENTS

| | | |
|---|---|---|
| EP | 1 160 770 | 12/2001 |
| EP | 1 396 841 | 3/2004 |

OTHER PUBLICATIONS

Wah et al.; "A Survey of Error-Concealment Schemes for Real-Time Audio and Video Transmissions over the Internet", Multimedia Software Engineering, Dec. 11, 2000, pp. 17-24, XP010528702, ISBN: 0-7695-0933-9.
Apostolopoulos, Hewlett-Packard Laboratories, California, USA: "Reliable Video Communication Over Lossy Packet Networks Using Multiple State Encoding and Path Diversity", pp. 392-409, XP008007254, ISSN: 0277-786X.

(Continued)

*Primary Examiner* — Y. Lee
*Assistant Examiner* — Richard Torrente
(74) *Attorney, Agent, or Firm* — Lisa K. Jorgenson; Allen, Dyer, Doppelt, Milbrath & Gilchrist, P.A.

(57) ABSTRACT

The method for encoding and/or decoding video signals, includes the operations of generating at a transmitter side a multiple descriptions vector associated to a pixel values vector of the video signals and decoding at a receiver side available descriptions vector for reconstructing the pixel values vector. The operation of generating a multiple descriptions vector includes the steps of obtaining the pixel values vector by selecting a group of pixels in a picture of the video signal and applying an encoding matrix to the pixel values vector. The decoding operation includes the step of applying a decoding matrix that is in an inverse relationship with the encoding matrix to the available descriptions vector to obtain the pixel values vector.

21 Claims, 4 Drawing Sheets

OTHER PUBLICATIONS

M. Khansari et al., "Subband Decomposition of Signals with Generalized Sampling", 8084 IEEE Transations on Signal Processing 41 Dec. 1993, No. 12, New York, US, pp. 3365-3375, XP 000426653.

Chen et al., "Recent Developments in Multidimensional Multirate Systems", 8378 IEEE Transactions on Circuits and Systems for Video Technology, Apr. 3, 1993, No. 2, New York, US, XP 000367177, pp. 116-137.

Lee et al., "AN Integrated Application of Multiple Description Transform Coding and Error Concealment for Error-Resilient Video Streaming", © 2003 Published by Elsevier, pp. 957-970.

Fumagalli et al., "Video Transmission Over IP By Using polyphase Downsampling Multiple Description Coding", IEEE Iternational Conference on Multimedia and Expo © 2001 IEEE 0-7695-1198-8, pp. 161-163.

Zeng et al., "Efficient Frequency Domain Video Scrambling for Content Access Control", ACM Multimedia, Orlando, Florida, XP-000956270, pp. 285-295.

"Video Coding for IP Transmission by Using Polyphase Downsampling Multiple Description", Caramma et al., EUROCON 2001, International Conference on Trends in Communications, Bratislava, Slovakia, IEEE, vol. 2, pp. 359-362 vol. 2, Jul. 4, 2001-Jul. 7, 2001, ISBN: 0-7803-6490-2.

Goyal "Multiple Description Coding: Compression Meets the Network" IEEE Signal Proc. Mag. Sep. 2001 pp. 74-93.

Cosman et al., "Vector Quantization of Image Subbands: a Survey", Sep. 1995; Robert Swann, "MPEG-2 Video Coding over Noisy Channels", Signal Processing and Communication Lab, University of Cambridge, Mar. 1998.

Swann, "MPEG-2 Video Coding for Noisy Channels", Signal Processing and Communication Lab, University of Cambridge, Mar. 1998.

Gray "Quantization", IEEE Transactions on Information Theory, vol. 44, o. 6, Oct. 1998.

Goyal, "Beyond Traditional Transform Coding", University of California, Berkeley, Fall 1998.

Kovačević et al., "Multiple Descriptions—Source-Channel Coding Methods for Communications", Bell Labs, Innovation for Lucent Technologies, 1998.

Goyal et al., "Multiple Description Transform Coding of Images", Proceedings of IEEE Conf. on Image Proc., Chicago, Oct. 1998.

Servetto, "Compression and Reliable Transmission of Digital Image and Video Signals", University of Illinois at Urbana-Champaign, 1999.

Apostolopoulos et al., "Unbalanced Multiple Description Video Communication using Path Diversity", IEEE International Conference on Image Processing (ICIP), Thessaloniki, Greece, Oct. 2001.

Apostolopoulos et al., "Modeling Path Diversity for Multiple Description Video Communication", ICASSP, May 2002.

Apostolopoulos et al., "On Multiple Description Streaming with Content Delivery Networks", HP Labs, Palo Alto, Feb. 2002.

Apostolopoulos et al., "Video Streaming: Concepts, Algorithms and Systems", HP Labs, Palo Alto, Sep. 2002.

* cited by examiner

METHOD FOR ENCODING/DECODING SIGNALS WITH MULTIPLE DESCRIPTIONS VECTOR AND MATRIX

FIELD OF THE INVENTION

The present invention relates to encoding/decoding techniques, for example for video signals, and more particularly, to coding video signals by Multiple Description Coding (MDC).

BACKGROUND OF THE INVENTION

The goal of Multiple Description Coding, as described e.g. in V. K. Goyal "Multiple Description Coding: Compression Meets the Network" IEEE Signal Proc. Mag. September 2001 pp. 74-93, is to create several independent bitstreams using an existing video codec (i.e. coder-decoder), that are then sent over independent paths. Bitstreams can be decoded independently or jointly. The larger the number of the bitstreams decoded, the larger the quality of the output video signal.

Multiple Description Coding requires a pre-processing stage upstream of the encoder, to split the video sequence and control redundancy among subsequences. It also requires a post-processing stage downstream of the decoder, to merge the received and successfully decoded substreams.

Multiple Description Coding greatly improves error resiliency, because each bitstream can be decoded independently. Also, variable bandwidth/throughput requirements can be managed by transmitting a suitable number of descriptions. However, coding efficiency is somewhat reduced depending on the amount of redundancy left among subsequences.

Multiple Description Coding is essentially analogous to Scalable Coding (also known as Layered Coding). The difference lies in the dependency among bitstreams. The simplest case is when two bitstreams are created. In the case of scalable coding they are referred to as "base layer" and "enhancement layer", respectively. The latter layer depends on the former layer and cannot be decoded independently therefrom. On the other hand, in the case of Multiple Description Coding, each description can be individually decoded to get a base quality video. As for Scalable Coding, there can be spatial, temporal or SNR (Signal-to-Noise Ratio) Multiple Descriptions (MD).

Replicated headers/syntax and replicated motion vectors among bitstreams greatly impede coding efficiency in SNR MD. Replicated headers/syntax also hinder temporal MD, and motion compensation is less effective because of the increased temporal distance between frames. Spatial MD is hindered by headers/syntax as well. However, contrary to temporal MD, motion compensation is not affected, particularly when 8×8 blocks are split into smaller blocks, as in the latest H.264 codec. Because of this, spatial MD Coding is usually regarded as the best choice for video coding.

The underlying video codec can be either one of the traditional approaches based on DCT (Discrete Cosine Transform) transform and motion compensation (e.g. MPEG-x, H.26x), or one of the more recent codec based on the wavelet 3D transform (e.g. SPHIT). From U.S. Pat. No. 6,345,125 a technique for Multiple Description Transform Coding is known, that is based on matrix multiplication and exploits a QFE (Quantized Frame Expansion) technique. Such a technique however it is not very effective and flexible in connection with video signals, in particular descriptions generated by QFE techniques have poor visual meaning. Thus, compressing subsequences is a very difficult task in the QFE framework. Specific procedures are required and lossless techniques have to be used.

The topics considered in the foregoing form the subject of extensive technical literature, as witnessed e.g. by: P. C. Cosman, R. M. Gray, M. Vetterli, "Vector Quantization of Image Subbands: a Survey", September 1995; Robert Swann, "MPEG-2 Video Coding over Noisy Channels", Signal Processing and Communication Lab, University of Cambridge, March 1998; Robert M. Gray "Quantization", IEEE Transactions on Information Theory, vol. 44, n.6, October 1998; Vivek K. Goyal, "Beyond Traditional Transform Coding", University of California, Berkeley, Fall 1998; Jelena Kovacevic, Vivek K. Goyal, "Multiple Descriptions—Source-Channel Coding Methods for Communications", Bell Labs, Innovation for Lucent Technologies, 1998; Jelena Kovacevic, Vivek K. Goyal, Ramon Arean, Martin Vetterli, "Multiple Description Transform Coding of Images", Proceedings of IEEE Conf. on Image Proc., Chicago, October 1998; Sergio Daniel Servetto, "Compression and Reliable Transmission of Digital Image and Video Signals", University of Illinois at Urbana-Champaign, 1999; Benjamin W. Wah, Xiao Su, Dong Lin, "A survey of error-concealment schemes for real-time audio and video transmission over internet". Proceedings of IEEE International Symposium on Multimedia Software Engineering, December 2000; John Apostolopoulos, Susie Wee, "Unbalanced Multiple Description Video Communication using Path Diversity", IEEE International Conference on Image Processing (ICIP), Thessaloniki, Greece, October 2001; John Apostolopoulos, Wai-Tian Tan, Suise Wee, Gregory W. Womell, "Modeling Path Diversity for Multiple Description Video Communication", ICASSP, May 2002; John Apostolopoulos, Tina Wong, Wai-Tian Tan, Susie Wee, "On Multiple Description Streaming with Content Delivery Networks", HP Labs, Palo Alto, February 2002; and John Apostolopoulos, Wai-Tian Tan, Susie J. Wee, "Video Streaming: Concepts, Algorithms and Systems", HP Labs, Palo Alto, September 2002.

SUMMARY OF THE INVENTION

An object of the present invention is thus to provide an improved arrangement overcoming drawbacks of the prior art arrangements discussed above, and provide a method for encoding and decoding video signals through Multiple Description Coding that is easy to implement in encoders and decoders.

According to the present invention, objects are achieved with a method having the features set forth in the claims that follow. The invention also relates to corresponding encoding and decoding systems as well as a computer program product loadable in the memory of at least one computer and including software code portions for performing the method of the invention.

A preferred embodiment of the invention is thus a method for encoding/decoding a video signal sequence that provides for generating therefrom multiple description subsequences with suitable equations systems, represented by corresponding encoding matrixes designed and optimized using mathematical techniques. Decoding matrixes that are in an inverse relationship with such encoding matrixes are exploited for decoding the video signal at the receiver side. A particularly preferred embodiment of the invention is directed to utilizing equivalence of such encoding and decoding matrixes with a bank of filters for circuit implementation.

BRIEF DESCRIPTION OF THE DRAWINGS

The invention will now be described, by way of example only, by referring to the drawing figures, wherein.

DETAILED DESCRIPTION OF THE PREFERRED EMBODIMENTS

Figure 1:
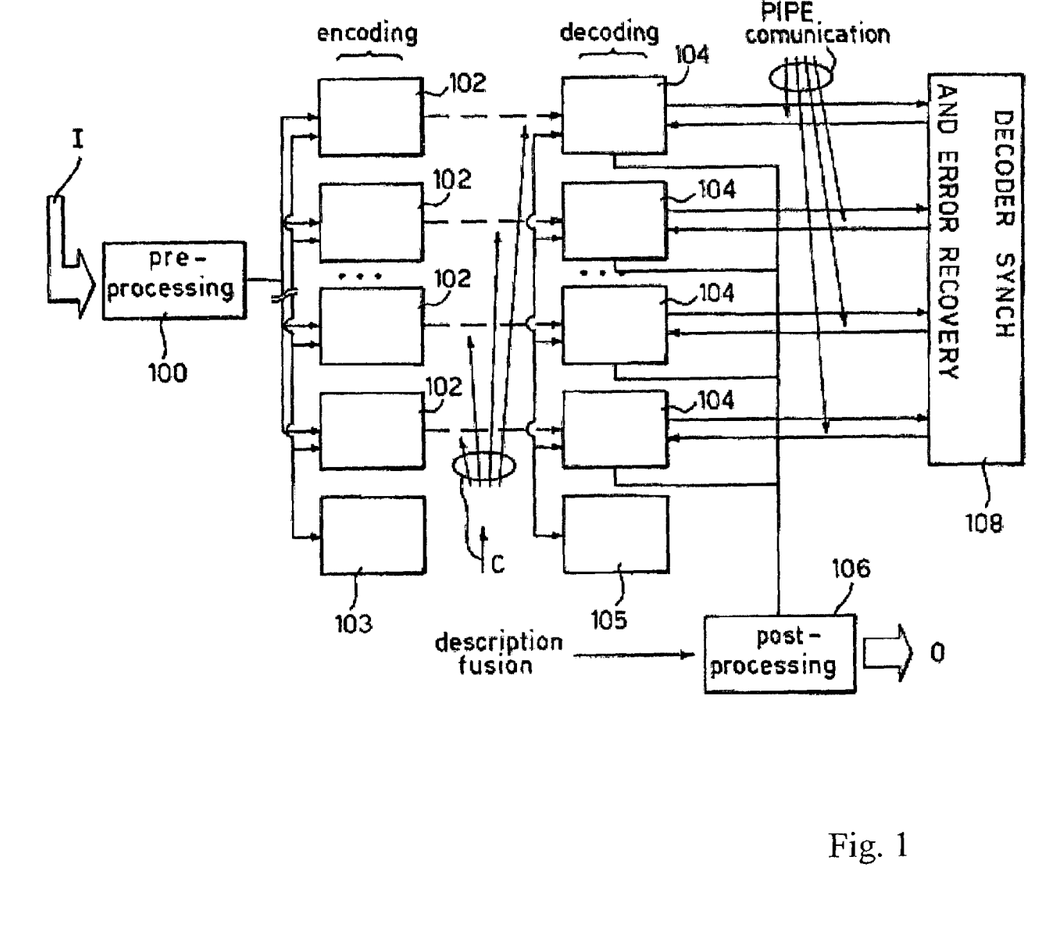
FIG. 1 is a schematic block diagram of an exemplary encoding-decoding system according to the present invention.

FIG. 1 shows a block diagram of an encoding/decoding system adapted to operate according to the invention. There, reference I indicates an input video sequence including a digital video signal to be transmitted. The input signal I is fed to a pre-processing block 100 that creates multiple descriptions. The subsequences from the pre-processing block 100 are fed to a set of N encoder blocks, each indicated by the reference 102. In the arrangement described herein, each encoder 102 though independent is driven by a common controller 103 able to tune the encoding parameters (e.g. target bitrate, GOP structure, slice partitioning) used in the encoders 102.

The encoder signals from the encoder blocks 102 are sent over a transmission channel C to the receiver side. On the receiver side a set of N H.264 decoder blocks are provided, each indicated by the reference 104. The video decoders 104 are driven by a controller 105 able to tune decoding parameters (e.g. concealment algorithms) of each video decoder 104. The output signals of the decoder blocks 104 are fed to a synchronization block 108 and the signals from this block are sent to the decoder blocks. The synchronization block 108 is also able to effect error recovery. The output signals from the decoder blocks 104 are also fed to a post-processing block 106 that merge the multiple descriptions. The output of the post-processing block 106 is the output sequence O.

The method according to the invention substantially provides for generating at the pre-processing stage 100 a multiple descriptions vector $\vec{d}$, containing a plurality of descriptions, from $d_1$ to $d_D$, where D indicates the number of descriptions. Such a descriptions vector $\vec{d}$, is generated by using a system of equations, whose coefficients are represented by a corresponding encoding matrix M, whereas a pixel values vector $\vec{p}$, related to a group G of P pixels in the input signal I, $p_1 \ldots p_P$, represent a variable vector.

Descriptions vector $\vec{d}$ is a vector of constants generated by a weighted sum of such variables, i.e. by matrix multiplying such a pixel values vector $\vec{p}$ by the encoding matrix M, according to the following relationship:

$$\vec{d} = M\vec{p} \qquad (1)$$

The method according to the invention further provides for merging at the post-processing stage 106 an available descriptions vector $\vec{d}'$, using a further system of equations, represented by a decoding matrix M' that is in an inversion relationship with such an encoding matrix M. In particular the decoding matrix M' is the inverse or pseudoinverse of such encoding matrix M. In this case pixel values vector $\vec{p}$ represents the unknown quantity to be calculated, by matrix multiplying the available descriptions vector $\vec{d}'$ by the decoding matrix M', according to the following relationship:

$$\vec{p} = M'\vec{d}' \qquad (2)$$

According to another important aspect of the invention, equations systems, represented by the encoding matrix M and by the decoding matrix M' can be designed and optimized using mathematical techniques and equivalence with a bank of filters can be further utilized for circuit implementation of such matrixes M and M'.

Figure 2:
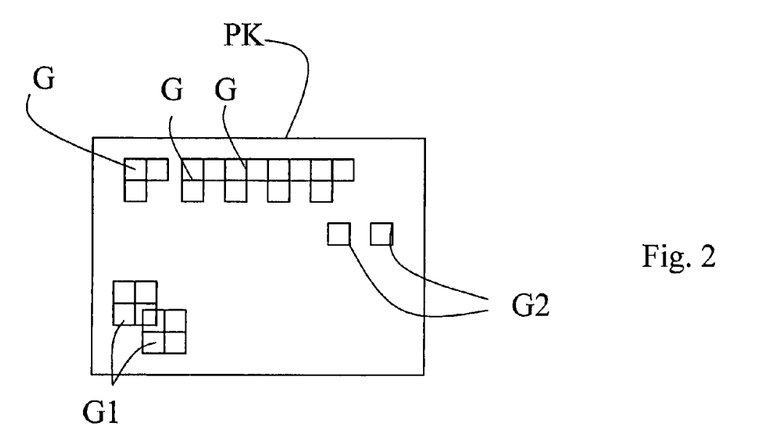
FIG. 2 is a schematic diagram of picture partitioning within the framework of the arrangement described herein.

Now an encoding procedure taking place at the pre-processing stage 100 will be described in detail. As can be seen in FIG. 2, as a first step a picture PK, belonging to input signal I and to be encoded, is partitioned in groups of pixels G. Groups of pixels G can have any shape. Pixels of a given group G need not to be adjacent to each other. However, it is preferable that the shape of a group G is as circular as possible. Also it is preferable that pixels are adjacent to each other, like groups G and G1 shown in FIG. 2 and unlike groups G2, since adjacent pixels are likely to be similar. Information about shape and relative location of groups G of pixels chosen for generating the descriptions vector $\vec{d}$ constitutes deduced information about the statistics that may then be exploited by the post-processing block 106, particularly when some description is not available at the receiver side.

Pixels can be part of more than one group G or, which is the same, groups G can overlap partially, like groups G2 in FIG. 2. The more the amount of overlap, the more the redundancy that will be present in the descriptions vectors $\vec{d}$ transmitted on channel C. Groups G need not to cover all the picture PK or, which is the same, it is possible to have holes between adjacent groups, like between groups G2, without necessarily hindering the reconstruction of the picture PK. However, if groups G do not cover the whole picture PK, then it is not possible to guarantee the perfect reconstruction of the picture.

According to the proposed method, a respective encoding matrix M of coefficients is associated to each group G of pixels. Such an encoding matrix M has D rows and P columns. Although groups that are similar among groups G of pixels can share the same encoding matrix M, in general, however, each group G will have its own encoding matrix M. Alternatively, there can be a set of encoding matrixes M that it is shared among similar groups G and a suitable rule, e.g. based on the spatial position of the group G within the picture PK, can be used to link a given group G to one encoding matrix M among those available in the set.

If the encoding matrix M, associated to a certain group G of P pixels, has a block diagonal structure, then it is possible to partition the system in many sub-systems, one for each sub-matrix. Each sub-system will link a subset $P_i$ of the P pixels in group G to a subset $D_i$ of the D descriptions, as better detailed in the following.

The descriptions vector $\vec{d}$, as already mentioned, comprises a plurality of descriptions, $d_1 \ldots d_D$, that are generated with a single matrix multiplication between the encoding matrix M of the coefficients of the encoding equation system and the column pixel values vector $\vec{p}$, as per equation (1). Such a column values vector $\vec{p}$ is made of P pixels, $P_1 \ldots p_P$, taken from the group G in a given order. Equation (1), expanded, becomes thus:

$$\vec{d} = M\vec{p} \Leftrightarrow \begin{bmatrix} d_1 \\ d_2 \\ \vdots \\ d_{D-1} \\ d_D \end{bmatrix} \quad (3)$$

$$= \begin{bmatrix} m_{1,1} & m_{1,2} & \cdots & m_{1,P-1} & m_{1,P} \\ m_{2,1} & m_{2,2} & & m_{2,P-1} & m_{2,P} \\ \vdots & & \ddots & & \vdots \\ m_{D-1,1} & m_{D-1,2} & & m_{D-1,P-1} & m_{D-1,P} \\ m_{D,1} & m_{D,2} & \cdots & m_{D,P-1} & m_{D,P} \end{bmatrix} \begin{bmatrix} p_1 \\ p_2 \\ \vdots \\ p_{P-1} \\ p_P \end{bmatrix}$$

where the encoding matrix M contains D×P elements, or coefficients $m_{i,j}$, ranging from $m_{1,1}$ to $m_{D,P}$.

If the number D of descriptions is greater or equal than the number P of pixels, then it is possible to guarantee the perfect reconstruction of pixels through the decoding procedure. If the number D of descriptions is lower than the number P of pixels, then this is not possible.

Figure 3:
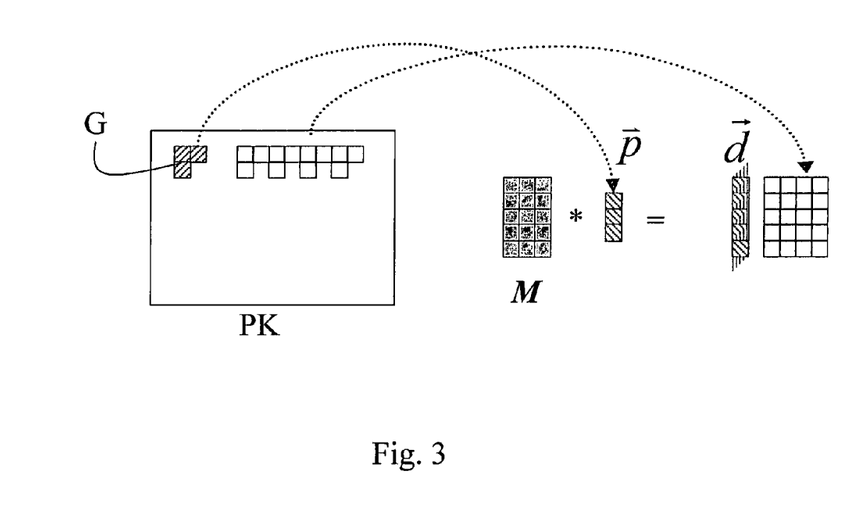
FIG. 3 is a schematic diagram of an encoding step within the framework of the arrangement described.

In FIG. 3 is graphically represented the encoding procedure, that leads from a group G of pixels $p_1 \ldots p_P$ (hatched squares in FIG. 3) to obtain the corresponding column pixel values vector $\vec{p}$, to be multiplied by the corresponding encoding matrix M to obtain the vector of descriptions $\vec{d}$. The encoding procedure is then applied to all the other groups G (white squares in FIG. 3) covering picture PK to obtain corresponding descriptions vectors. Hence, to guarantee the perfect reconstruction of the picture PK: all pixels must be part of at least one group G; groups G should be associated to an encoding matrix M with D≧P; and the rank of the encoding matrix M should be P.

If all the above conditions are met and if the multiple description decoder 104 is fed with at least P unaltered descriptions $\vec{d}$, then it will be able to reconstruct the picture PK perfectly. However, it must be noted that usually the descriptions $\vec{d}$ will be altered, so that available descriptions $\vec{d}'$ at the receiver side will be different. This alteration can occur because descriptions $\vec{d}$ are compressed before transmission using lossy algorithms. Also, in case an error-prone channel is used for transmission, there may be less than P descriptions available at the receiver side.

It must be noted that the encoding matrix M can have many of its coefficients $m_{1,1} \ldots m_{D,P}$ set to zero. Hence the encoding matrix M, or a suitable permutation applied to such matrix, can have a block diagonal structure, i.e. it is made of many smaller non-zero sub-matrixes $M_i$ placed along the diagonal of the encoding matrix M. Such sub-matrixes $M_i$ can have size down till to 1×1, i.e. all non-zero coefficients are put along the diagonal.

As each row of the encoding matrix M is linked to a specific description $d_1 \ldots d_D$ and each column of the encoding matrix M is linked to a specific pixel $P_1 \ldots p_P$, permutations applied to the encoding matrix M are reflected in a corresponding reordering of the descriptions vector $\vec{d}$ and of the pixels vector $\vec{p}$. Each sub-matrix $M_i$ will thus link a description sub-set $D_i$ to a pixel sub-set $P_i$. The pixel sub-set $P_i$ will form a sub-group in the picture PK.

In view of analysis, design and implementation complexity, it is useful to decompose the encoding matrix M in as many independent sub-systems as possible. Now a decoding procedure performed at the post-processing stage 106 will be described in detail. Upon reception of a number D' of available descriptions $d_1 \ldots d_D$ in the corresponding available descriptions vector $\vec{d}'$, the decoding matrix M' is computed as follows. The rows corresponding to received descriptions $\vec{d}'$ are taken from the encoding matrix M to form a reduced matrix $M_r$.

If the number of received description D' is equal to the number of pixels P and the rank of the reduced matrix $M_r$ is equal to the number of pixels P, then the decoding matrix M' will correspond to the inverse of the reduced matrix, inv $(M_r)$, that can be computed as the reduced matrix $M_r$ is square and invertible. Otherwise a pseudo-inverse matrix pinv $(M_r)$ of the reduced matrix $M_r$ is computed as decoding matrix M'.

The pixels vector $\vec{p}$ is then reconstructed by a single matrix multiplication between the pseudo-inverse matrix pinv$(M_r)$ or the inverse matrix inv$(M_r)$ and the column vector of available descriptions $\vec{d}'$:

$$\vec{p} = M'\vec{d}' \Leftrightarrow \begin{bmatrix} p_1 \\ p_2 \\ \vdots \\ p_{P-1} \\ p_P \end{bmatrix} = \begin{bmatrix} m'_{1,1} & \cdots & m'_{1,D'} \\ m'_{2,1} & \cdots & m'_{2,D'} \\ \vdots & \ddots & \vdots \\ m'_{P-1,1} & \cdots & m'_{P-1,D'} \\ m'_{P,1} & \cdots & m'_{P,D'} \end{bmatrix} \begin{bmatrix} d_1 \\ \vdots \\ d_{D'} \end{bmatrix} \quad (4)$$

If the rank of the decoding matrix M' is greater than the number of pixels P, then the system is over-determined and the reconstructed pixel vector $\vec{p}$ will be the minimum least square solution of the system. Alternatively, a subset of descriptions can be used among those available at the decoder: a subset matrix M" is computed from the decoding matrix M' by deleting columns corresponding to unused descriptions until the system is determined.

If the rank of the decoding matrix M' is lower than the number of pixels P, then the system is under-determined. In this case the system may be solved as is, again using the pseudo-inverse matrix pinv$(M_r)$. Alternatively, if the encoding matrix M, or a suitable permutation, has block diagonal structure, a subset of pixels can be reconstructed at the decoder. To make the system determined, the subset matrix M" is computed from the decoding matrix M' by deleting rows corresponding to unreconstructed pixels until the system is determined.

Alternatively, when there are no sub-system to solve, because no permutation of the encoding matrix M has a block diagonal structure, equations can be added to the under-determined system to make it determined. These equations can be added to the encoding matrix M prior inverting the system, thus the encoding matrix M will have more columns, or they can be added to the decoding matrix M' after having inverted the system. In this case the decoding matrix M' will have more rows. The vector of descriptions $\vec{d}'$ will be extended accordingly. Such added equations are based on the knowledge of the statistics of the pixels which were used.

The method according to the invention also includes coupled concealment procedures. When a subset of pixels has been reconstructed, unreconstructed pixels may be concealed by a suitable post-processing taking place at the post-processing stage 106. Alternatively all pixels can be reconstructed at once without any post-processing. It must be appreciated how compact is the decoding procedure. If there are a number D of descriptions, then there are $2^D$ loss patterns to be considered at the receiver side, as each description among the plurality of descriptions $d_1 \ldots d_D$ may be available, i.e. received, or not.

Classical concealment procedures must handle each of these cases to optimally conceal missing descriptions. On the opposite, the described procedure is quite general, it need not be customized to handle each case. Also, it can be mathematically characterized, as can be better appreciated in the following dealing with error bounds when altered descriptions are used.

Also, it must be appreciated how easy it is in this framework to take into account the knowledge of the statistics of the pixels. Classical decoding procedure can be extended to exploit deductive or inductive statistics. In general this is done with some matched filter that should be placed after the multiple description decoding in post processing block 100. The described decoding procedure performs multiple description decoding and matched filtering at the same time. Also, it can be mathematically optimized.

As an example, the deductive knowledge that "neighboring pixels are similar" can be exploited as follows: an equation may be added to specify that a given pixel within the group G, preferably one of unreconstructed pixels, is equal to some other pixel, preferably one of the reconstructed pixels within the same group G. The added equation has only two non-zero coefficients: +1 and −1. The vector of description $\vec{d}$ is correspondingly extended with a zero. As another example, the inductive knowledge of the mean value can be exploited as follows: an equation may be added to specify that the mean value of a set of pixels, preferably the set of unreconstructed pixels, is equal to the mean value of a set of other pixels, preferably the set of reconstructed pixels (within the same group or in other neighboring groups). The added equation has n non-zero coefficients set to the value of 1/n. The vector of descriptions $\vec{d}$ is correspondingly extended with the mean value.

As a further example, the inductive knowledge of the presence and direction of an edge can be exploited as follows: first the direction of the edge is detected by calculating a gradient function on the reconstructed pixels (within the same group G or in other neighboring groups), then missing pixels are set equal to other reconstructed pixels along the same direction. The added equation in the matrix M has only two non-zero coefficients: +1 and −1. The descriptions vector $\vec{d}$ is extended with a zero. The deductive statistic can be enforced using a suitable pre-processing filter, placed in the pre-processing block 100, before generating multiple descriptions. In the case of the aforementioned statistic, a low-pass pre-processing filter can be used. The lower the cutoff frequency or the higher to stop-band attenuation, the more the redundancy among descriptions due to this enforced deductive statistic.

A similar pre-processing stage is detailed with reference to FIG. 5a. There it can be also appreciated that using the proposed encoding procedure, any separated pre-processing filter in pre-processing block 100 can be avoided. A suitable set of coefficient $m_{1,1}$ to $m_{D,P}$ for the encoding matrix M can be chosen so that filtering and multiple description encoding is done at the same time.

The method according to the invention also includes decoupled concealment procedures. When only a subset of pixels has been reconstructed, unreconstructed or wrong pixels must be recovered in some way. If decoders are completely decoupled, unreconstructed or wrong pixels must be identified and corrected in the post-processing stage 108. A simple mechanism that exploits the deductive statistic of a video signal is the well-known median filter: usually unreconstructed or wrong pixels will be very different from neighboring pixels, therefore they will be discarded and substituted with a suitable value. As an example, the 3×3 median filter can be used.

Another simple mechanism, that is multiple descriptions-aware, will take as input the same set of groups G which have been used for multiple descriptions coding. Unreconstructed pixels in each group G will be identified by computing the absolute difference of the pixels and the estimated average value, if it is above a given threshold then the pixels will be replaced by the estimated average value. Alternatively, the pixel having the greatest absolute difference can be replaced always, regardless of the threshold. Unfortunately, the error identification capability depends on the statistic of the video signal. However, any concealment technique that is available in each decoder can be turned on.

If decoders are partially coupled, unreconstructed pixels may be set to a given agreed value. In this way identification of pixels which have to be corrected is much easier. As an example unreconstructed or wrong pixels may be set to black (this corresponds to values Y=0, $C_b$=128, $C_r$=128 in the $YC_bC_r$ color space). Alternatively and preferably, unreconstructed or wrong pixels may be set to an impossible value in the $YC_bC_r$ color space (e.g. Y=0, $C_b$=0, $C_r$=0). The error identification capability depends on the robustness of the decoder against corrupted bitstreams. Any concealment techniques that is available in each decoder must be turned off.

It must be noted that the encoding matrix M can be interpreted as a geometrical transformation, where In this case the vector of pixels is interpreted as a point in a P-dimensional space, as well as the vector of descriptions is interpreted as a point in a D-dimensional space. If the number of descriptions D is equal to the number of pixel P, then the encoding matrix M can be regarded as describing a sequence of rotations, scalings and tiltings in the P (or D) dimensional space.

If the number of descriptions D is lower than the number of pixel P, then the encoding matrix M can be interpreted as a projection matrix to the D-dimensional space, e.g. a matrix used for transforming from three dimensions to two dimensions. Thus, if the number of descriptions D is greater than the number of pixel P, then the encoding matrix M can be interpreted as a projection matrix to a P-dimensional hyperplane in the D-dimensional space.

From the above considerations it turns out that by operating on coefficients of the encoding matrix M it is possible to control the dynamic, i.e. the maximum and minimum value, of the generated descriptions, but not an offset, i.e. translations are not possible using the encoding matrix M. However translations of the descriptions may be included, adding a corresponding offset vector $\vec{m}$ to the encoding matrix M as follows:

$$\vec{d} = M\vec{p} + \vec{m} \Leftrightarrow \begin{bmatrix} d_1 \\ d_2 \\ \vdots \\ d_{D-1} \\ d_D \end{bmatrix} = \begin{bmatrix} m_{1,1} & m_{1,2} & \cdots & m_{1,P-1} & m_{1,P} \\ m_{2,1} & m_{2,2} & & m_{2,P-1} & m_{2,P} \\ \vdots & & \ddots & & \vdots \\ m_{D-1,1} & m_{D-1,2} & & m_{D-1,P-1} & m_{D-1,P} \\ m_{D,1} & m_{D,2} & \cdots & m_{D,P-1} & m_{D,P} \end{bmatrix} \begin{bmatrix} p_1 \\ p_2 \\ \vdots \\ p_{P-1} \\ p_P \end{bmatrix} + \quad (5)$$

-continued $$\begin{bmatrix} m_1 \\ m_2 \\ \vdots \\ m_{D-1} \\ m_D \end{bmatrix}$$

The decoding matrix M' is computed as before. If offsets $\vec{m}$ have been used, then they have to be subtracted from descriptions vector $\vec{d}'$ before the pixels vector $\vec{p}$ is reconstructed, as described by the following relation:

$$\vec{p} = M'(\vec{d}' - \vec{m}) \Leftrightarrow \begin{bmatrix} p_1 \\ p_2 \\ \vdots \\ p_{P-1} \\ p_P \end{bmatrix} = \begin{bmatrix} m'_{1,1} & \cdots & m'_{1,D'} \\ m'_{2,1} & \cdots & m'_{2,D'} \\ \vdots & \ddots & \vdots \\ m'_{P-1,1} & \cdots & m'_{P-1,D'} \\ m'_{P,1} & \cdots & m'_{P,D'} \end{bmatrix} \begin{bmatrix} d_1 - m_1 \\ \vdots \\ d_{D'} - m_{D'} \end{bmatrix} \quad (6)$$

Alternatively, as shown by following relation (7), it can be seen that the encoding matrix M, the descriptions vector $\vec{d}$ and pixels vector $\vec{p}$ can be extended to include also translations: vectors are extended with a value which is set to 1 if vectors are normalized; the encoding matrix M has an additional column of coefficients which specify the translation offsets, also it has an additional row of coefficients all set to zero except for the last one which is set to 1 if the encoding matrix M is normalized:

$$\begin{bmatrix} d_1 \\ d_2 \\ \vdots \\ d_{D-1} \\ d_D \\ 1 \end{bmatrix} = \begin{bmatrix} m_{1,1} & m_{1,2} & \cdots & m_{1,P-1} & m_{1,P} & m_1 \\ m_{2,1} & m_{2,2} & & m_{2,P-1} & m_{2,P} & m_2 \\ \vdots & & \ddots & & \vdots & \vdots \\ m_{D-1,1} & m_{D-1,2} & & m_{D-1,P-1} & m_{D-1,P} & m_{D-1} \\ m_{D,1} & m_{D,2} & \cdots & m_{D,P-1} & m_{D,P} & m_D \\ 0 & 0 & \cdots & 0 & 0 & 1 \end{bmatrix} \begin{bmatrix} p_1 \\ p_2 \\ \vdots \\ p_{P-1} \\ p_P \\ 1 \end{bmatrix} \quad (7)$$

The decoding matrix can be computed as follows: the reduced matrix $M_r$ is extracted from the extended encoding matrix M by extracting the rows corresponding to received descriptions $\vec{d}'$. The last row of the encoding matrix M (related to the last 1 in the description vector) is always taken. Then, as usual, the decoding matrix M' is set equal to the inverse or pseudoinverse of the reduced matrix $M_r$.

Alternatively, the reduced matrix $M_r$ can be computed as explained before with reference to equation (2). Then the decoding matrix M' can be extended to compensate for the offsets by adding one column of coefficients, as follows:

$$\begin{bmatrix} p_1 \\ p_2 \\ \vdots \\ p_{P-1} \\ p_P \\ 1 \end{bmatrix} = \begin{bmatrix} m'_{1,1} & \cdots & m'_{1,D'} & m'_1 \\ m'_{2,1} & & m'_{2,D'} & m'_2 \\ \vdots & \ddots & \vdots & \vdots \\ m'_{P-1,1} & & m'_{P-1,D'} & m'_{P-1} \\ m'_{P,1} & \cdots & m'_{P,D'} & m'_P \\ 0 & \cdots & 0 & 1 \end{bmatrix} \begin{bmatrix} d_1 \\ \vdots \\ d_{D'} \\ 1 \end{bmatrix} \quad (8)$$

This column of coefficients can be computed by multiplying the usual decoding matrix M' by the negated column vector of offsets m.

$$\begin{bmatrix} m'_1 \\ m'_2 \\ \vdots \\ m'_{P-1} \\ m'_P \end{bmatrix} = \begin{bmatrix} m'_{1,1} & \cdots & m'_{1,D'} \\ m'_{2,1} & \cdots & m'_{2,D'} \\ \vdots & \ddots & \vdots \\ m'_{P-1,1} & \cdots & m'_{P-1,D'} \\ m'_{P,1} & \cdots & m'_{P,D'} \end{bmatrix} \begin{bmatrix} -m_1 \\ \vdots \\ -m_{D'} \end{bmatrix} \quad (9)$$

Offsets can be used to implement a sort of "dithering" through the descriptions. In fact, descriptions will often be quantized (and then transmitted in a compressed form). By adding variable offsets to descriptions, dithering is implemented directly on descriptions. Offsets can be thus computed by taking into account the quantization error of neighboring groups G of descriptions. By using proper offsets, the resulting quantization error will compensate the quantization error of neighboring groups (ideally it will have opposite sign and value).

Alternatively, offsets can be computed only by considering the spatial position of the group G within the picture PK (i.e. the spatial position of the pixels in that group). This is useful to avoid flickering due to variable dithering in a sequence of pictures.

It must be noted that the proposed method also can exploit the fact that descriptions may have a limited dynamic. In fact, when descriptions are fed to a standard video encoder, they have to be represented as 8-bits unsigned integers. Therefore dynamic of descriptions will be limited to the interval [0, 255]. The encoding matrix M can be designed to respect this constraint. The i-th description $d_i$, where i is an index varying from 1 to D, is generated using the following equation:

$$d_i = \sum_{j=1}^{P} m_{i,j} p_j + m_i \quad (10)$$

The dynamic, i.e. the maximum and minimum value, of i-th description $d_i$ can be easily found. The minimum value can be found by computing the sum represented by equation (10) and using the maximum value $\max(p_j)$ if the encoding matrix M coefficients $m_{i,j}$ are less than zero, the minimum value $\min(p_j)$ if the encoding matrix M coefficients $m_{i,j}$ are greater than zero.

On the opposite the maximum value can be found by computing the sum (10) and using $\max(p_j)$ if the encoding matrix M coefficients $m_{i,j}$ are greater than zero, $\min(p_j)$ if the encoding matrix M coefficients $m_{i,j}$ are less than zero. If offsets ($m_i \neq 0$) are used then they must be added to the computed values. Because $\min(p_j)=0$ and $\max(p_j)=255$, the minimum value is simply the sum of negative coefficients multiplied by 255, while the maximum value is the sum of positive coefficients multiplied by 255. Again, offsets must be added if used, according to the following equations:

$$\max(d_i) = 255 \sum_{j|m_{i,j}>0} m_{i,j} + m_i \quad \min(d_i) = 255 \sum_{j|m_{i,j}<0} m_{i,j} + m_i \quad (11)$$

If $\max(d_i)>255$ or $\min(d_i)<0$ then description $d_i$ will suffer the overload distortion. When the description is out of range, then it is clipped (or saturated). This can be seen as if a suitable constant e is added to the i-th description $d_i$ to make it fall in the allowed range. If the i-th description $d_i>255$ then $e=d_i-255$, if $d_i<0$ then $e=0-d_i$. When decoding $d_i+e$ will be used instead of $d_i$.

The effect of the overload error can be easily computed (see below). It is interesting to note also that descriptions may have a limited precision. As already mentioned, when descriptions are fed to a standard video encoder, they have to be represented as 8-bits unsigned integers. There are thus 256 quantization levels in the allowed dynamic range [0, 255]. The distance between two consecutive quantization levels will be ½55th of the dynamic, i.e. a quantization interval, or quantization step Q, is 1. If the value of the i-th description $d_i$ is rounded to the nearest quantization level, then a quantization error $e_Q$ will lay in the range: $[-Q/2, +Q/2]=[-0.5, +0.5]$.

Depending on the desired compression ratio, the quantization step Q can be greater. In this case, the error range will also be greater. This can be seen as if a suitable constant corresponding to the quantization error $e_Q$ is added to the i-th description $d_i$. When decoding $d_i + e_Q$ will be used instead of $d_i$. The effect of the quantization error $e_Q$ on the reconstructed pixels can be easily computed.

The proposed method also comprises a procedure for dealing with error bounds. A general bound can be computed in a straightforward manner. Descriptions are computed with the encoding matrix M, according to equation (5), whereas reconstructed pixels are computed with the (pseudo-) inverse decoding matrix M' using available descriptions $\vec{d}'$, according to equation (6).

If descriptions are altered by an error $e_{d'}$ on the available descriptions, then reconstructed pixels $\vec{p}$ will also be affected by a pixel error $e_p$:

$$\vec{p} + \vec{e}_p = M'(\vec{d}' - \vec{m} + \vec{e}_{d'}) \qquad (12)$$

Simplifying, the vector of pixel errors $e_p$ can be found, given the vector of errors $e_{d'}$ on the available descriptions:

$$\vec{e}_p = M \vec{e}_{d'} \qquad (13)$$

The dynamic of errors on reconstructed pixels can also be computed, as it has been done for the dynamic of descriptions. The j-th pixel $p_j$, where j is an index ranging from 1 to P, is reconstructed using the following equation:

$$p_j = \sum_{i=1}^{D'} m'_{i,j}(d'_i - m_i) \qquad (14)$$

If descriptions are affected by errors, then also the j-th reconstructed pixel will be affected by a corresponding pixel error $e_{p_j}$ so it is possible to write:

$$p_j + e_{p_j} = \sum_{i=1}^{D'} m'_{i,j}(d'_i - m_i + e_{d'i}) \qquad (15)$$

Simplifying, the pixel error $e_{p_j}$ on the j-th reconstructed pixel $p_j$ can be computed, given errors on the available descriptions, according to the following:

$$e_{p_j} = \sum_{i=1}^{D'} m'_{i,j} e_{d'i} \qquad (16)$$

The dynamic pixel error $e_{p_j}$ on the j-th reconstructed pixel $p_j$ can be easily found. The minimum value can be found by computing the sum expressed by equation (16) and using $\max(e_{d',i})$ if $m'_{i,j} < 0$, $\min(e_{d',i})$ if $m'_{i,j} > 0$. On the opposite the maximum value can be found by computing the sum of equation (16) and using $\max(e_{d',i})$ if $m'_{i,j} > 0$, $\min(e_{d',i})$ if $m'_{i,j} < 0$. It must be noted that often the following equality is verified:

$$\min(e_{d',i}) = -\max(e_{d',i}) = e_Q \qquad (17)$$

Hence, for the error on the j-th reconstructed pixel, the minimum value is simply the sum of negated absolute values of coefficients multiplied by the quantization error $e_Q$, while the maximum value is the sum of absolute values of coefficients multiplied by the quantization error $e_Q$.

$$\max(e_{p_j}) = e_Q \sum_j |m'_{i,j}| \quad \min(e_{p_j}) = -e_Q \sum_j |m'_{i,j}| \qquad (18)$$

Errors on reconstructed pixels may be bounded in the pixel domain, but also they can be characterized in the frequency domain, since they are expressed through the matrix coefficients. This is especially useful when evaluating the perceptual meaning of such errors by taking into account the Human Visual System (HVS) characteristics.

Figure 4:
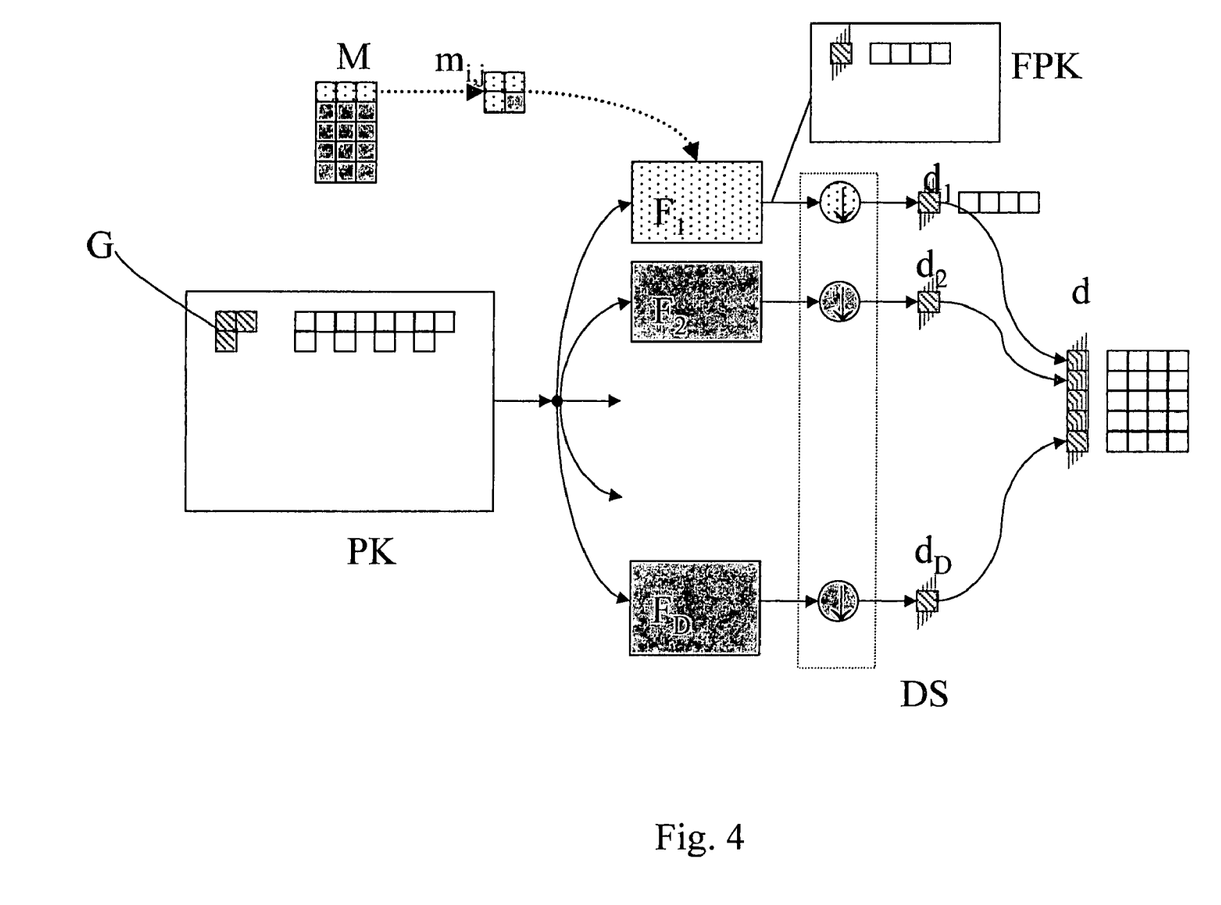
FIG. 4 is a schematic diagram of an encoding system within the framework of the arrangement described.

Now a procedure for designing an equivalent encoding filter bank will be detailed. An equivalent structure using filter banks can be devised both for multiple descriptions encoding and multiple descriptions decoding. The equivalent filter bank is computed as follows. As many parallel filters $F_1 \ldots F_D$ as the number of descriptions D are provided, as shown in FIG. 4. Each filter $F_1$ has a two-dimensional set of coefficient whose value is specified in the corresponding row of the encoding matrix M and whose position is specified by the position of the corresponding pixel in the pixel vector p. The output of each filter $F_1 \ldots F_D$ is downsampled in a suitable downsampling module DS so that surviving output values, a filtered picture FPK, from the downsampling module DS match the values computed when applying the encoding matrix M to the specified group of pixels G. Of course, discarded output values need not to be computed.

In other words, the encoding matrix M has D rows and P columns, the pixel vector $\vec{p}$ has P pixels. Therefore there will be D parallel filters $F_1 \ldots F_D$. The generic coefficient $m_{i,j}$ of the encoding matrix M is one of the coefficients of the i-th filter. Its two-dimensional spatial position is specified by the position of the j-th pixel within the group of pixels G to which the encoding matrix M is to be applied.

It must be appreciated that the filter bank structure shown in FIG. 4 is more flexible than a spatial/temporal polyphase downsampling structure. With the latter, one can only use one pre-processing filter. This means that all description will suffer the same information loss. With the filter bank structure, each description has its own pre-processing filter. This means that perfect reconstruction is possible as long as the information loss suffered in a given description is compensated by analogous information available in other descriptions.

For what concerns the multiple description procedure, an equivalent decoding filter bank can also be obtained. The equivalent filter bank is useful to study the two-dimensional spectrum of reconstructed pixels given the two-dimensional spectrum of incoming descriptions. In this way it is possible to evaluate the visibility of quantization errors introduced by video encoders.

Multiple Description decoding can be tuned so that the visibility of quantization errors is not enhanced. Once the MD decoding part has been optimized, the MD encoding part can be derived. In turn, once the MD encoding part has been derived, video encoders can be tuned.

The equivalent filter bank for implementing the decoding matrix M' is computed as follows: as many parallel filters $F'_1 \ldots F'_D$ as the number D of descriptions are provided. Each filter input is upsampled in suitable uplsampling module UP by zeros insertion to compensate the downsampling performed at the encoder. Each filter has a two-dimensional set of coefficients whose value is specified in the corresponding row of the transposed decoding matrix M' and whose position is specified by the position of the corresponding pixel in the reconstructed pixel vector.

The transposed decoding matrix M' has D rows and P columns, the reconstructed pixel vector has P pixels. Therefore there will be D parallel filters $F'_1 \ldots F'_D$. Let $m'_{i,j}$ be an element of the transposed decoding matrix M': this is one of the coefficients of the i-th filter. Its two-dimensional spatial position is specified by the position of the j-th pixel within the group of reconstructed pixels which the transposed decoding matrix M' generates. The output of each filter $F'_1 \ldots F'_D$ is summed at a given pixel position so that all contributions from all available descriptions d are used.

Figure 5A:
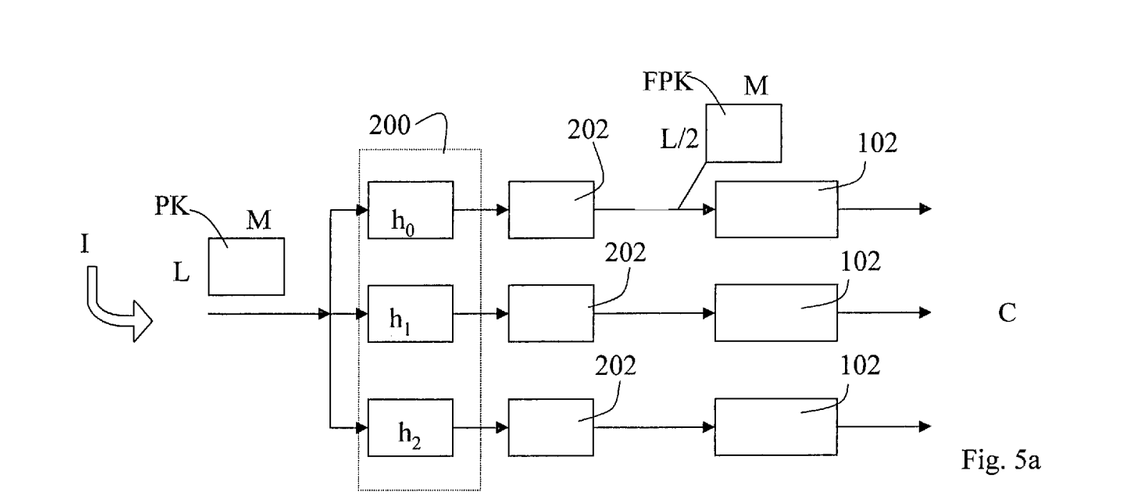
FIGS. 5a and 5b are schematic block diagrams of an embodiment of an encoding-decoding system within the framework of the arrangement described.

In FIG. 5a is shown a possible embodiment, where a deductive statistic is enforced using a suitable pre-processing filter, placed in the pre-processing block 100, that is a low-pass pre-processing filter can be used. A picture PK of a video sequence in the input signal I, having L columns and N rows, is sent to a bank of filters 200, disposed in parallel, comprising a first filter $h_0$ and a second filter $h_1$, that generate two descriptions by separating even and odd rows of the original video sequence. The corresponding filter impulses responses are $h_0(n)=\delta_n$ and $h_1(n)=\delta_{n+1}$. An additional filter $h_2$ produces an additional description, by a low-pass filtering operation in the column direction. Such an additional filter belongs to the family of Daubechies filters, that are orthogonal to their factor two translations. Each of the descriptions generated in the bank of filters 200 passes through a corresponding subsampling block 202, that performs a subsampling by a factor two, thus producing subsampled descriptions having L×N/2 size. The three subsampled descriptions are then coded through corresponding independent encoders 102, of the H.264/AVC type, that divide the input frame, i.e. the subsampled description, into slices made from macroblocks organized into rows, sending each slice on the network like a single packet.

Figure 5B:
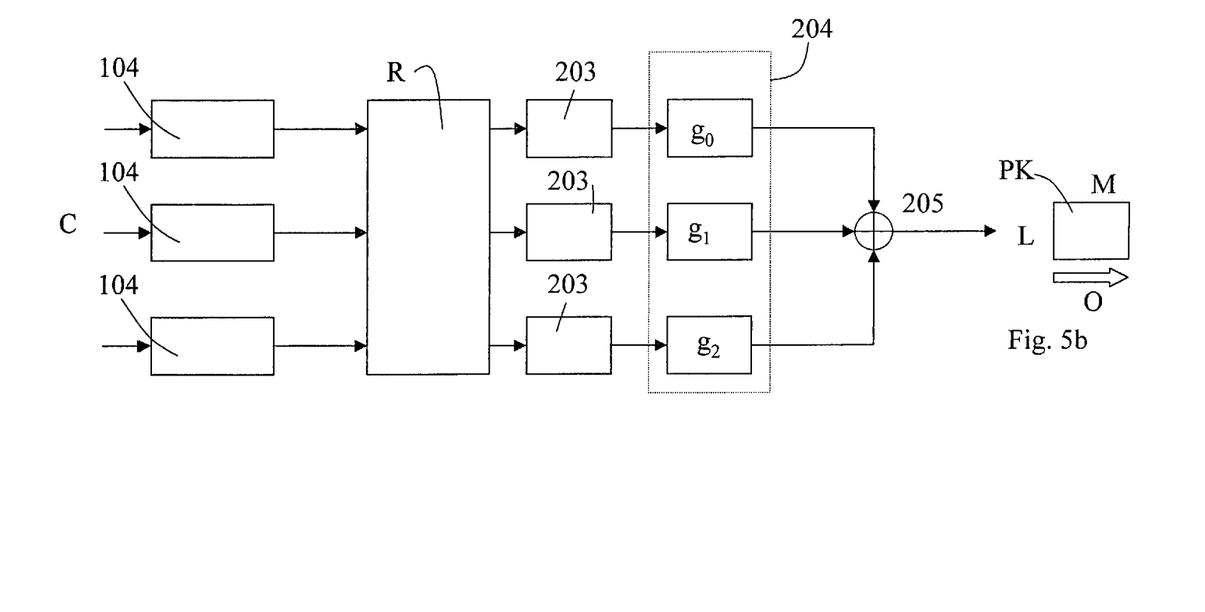

In FIG. 5b the receiver side is shown, where video streams are independently processed by decoders 104, that are H.264/AVC synchronized decoders. Such decoders 104 are connected to a restoring block R, which recovers channel errors. Restoring block R is similar to block 108 shown in FIG. 1, however in the embodiment of FIG. 1 error correction is performed in the pixel domain, whereas the restoring block R operates in the multiple description domain, before such descriptions are translated into pixels by the following blocks.

In the case of unrecoverable errors, missing regions in lost descriptions are reconstructed, using bilinear interpolation, from the received descriptions. The recovered subframes, having L×N/2 size, are thus outputted by the restoring block R and fed, after passing through a corresponding upsampling block 203, that performs an upsampling by a factor two, to a decoding bank of filter 204, comprising filters $g_0$, $g_1$ and $g_2$, that output the original full size sequences that are summed in a suitable sum block 205 to obtain picture PK.

The proposed method also includes a luma processing procedure. As it well known, video sequences can have interlaced luma: this means that each picture or frame is subdivided in two parts. The first part is made of all the odd lines and is called the top or odd field. The second part is made of all the remaining even lines and is called the bottom or even field. The two fields are acquired one after the other, hence the field rate is twice the frame rate.

Interlaced video is used to match the HVS (Human Visual System) characteristics. When there is no motion, the eye will see an high-definition still picture refreshed at the frame-rate. When there is motion, the eye will se a low-definition moving picture refreshed at the field-rate (which is twice the frame-rate). This is precisely what the eye wants to see. If this is taken into account, then fields are split prior multiple description encoding. Then descriptions from both fields are mixed so that each description is "interlaced" in the sense that it contains information of both fields. If this is not taken into account, fields are not split prior multiple description encoding. The frame is processed as a whole. This is called "direct luma processing".

In case the "direct luma processing" is used, it is preferable that each description contain information of only one field, either the top or the bottom. This is because standard video encoders can be easily tuned for progressive subsequences. Direct luma processing can be obtained by performed by demultiplexing for interlaced video prior encoding matrix multiplication and by field multiplexing after encoding matrix multiplication.

In other words, it is possible, by choosing a suitable-polyphase downsampling scheme, to generate descriptions that contains informations pertaining only one field. This allows for taking in account the interlaced structure of the picture. To do so, it is sufficient that such downsampling scheme includes a vertical downsampling on the rows suitable for separating even rows from the odd rows. The final result is that the descriptions, containing information about only one field, are coded more efficiently.

The indirect processing, on the other hand takes in account the interlaced structure of the picture, separating the two interlaced fields and creating two descriptions for the two fields that are then merged in a single set of descriptions, containing information about both the two fields. The encoding of such a single merged set of descriptions is more heavy from a computational point of view and thus less efficient. Alternatively, descriptions from both fields have to be mixed in an optimal way so that they match as closely as possible the statistic of an interlaced video. This is because standard video encoders can also be tuned for interlaced video.

In conclusion, the "direct luma processing" is preferable. In fact, it is difficult to mix descriptions from both fields in an optimal way, while it is relatively easy to have descriptions that contain information of only one field.

The proposed method also includes a chroma processing procedure. Video sequence usually have subsampled chroma: this means that each picture has subsampled chroma signals. Subsampling can be either horizontal (as in 4:2:2 format) or both horizontal and vertical (as in 4:2:0 formats). Subsampled chroma is used to reduce the amount of the information by discarding what cannot be seen because of the HVS characteristics. The eye is most sensitive to the luma, then luma must be at full resolution while the chroma can be downsampled (2:1 or even 4:1).

If this is taken into account, then the chroma is upsampled to full resolution (4:4:4) prior multiple description encoding. Then chroma descriptions are downsampled in a suitable way, so that in each description the ratio of chroma information with respect to luma is the same as before (i.e. ½ or ¼). If this is not taken into account, chroma is not upsampled to 4:4:4 prior multiple description encoding. The subsampled chroma is processed as is. This is called "direct chroma processing".

In case of chroma upsampling and downsampling, fields must be processed separately to avoid color artifacts that may arise due to the motion of objects. In case the "direct chroma processing" is used, it is important to ensure that each description has chroma information closely related (spatially and temporally) to the luma information. This is because it is desirable to keep the independent decoding property of each description.

As an example: if one description holds luma information from one field and chroma information from the other field, color artifacts will be likely in case there is motion of objects because of the temporal distance between fields. This means that the luma information will be usable only if another description is available, specifically the one with the correct chroma information. It can be observed that it is more important to keep the temporal relation among luma and chroma sample rather than the spatial relation. This is because color artifacts due to small offsets among the luma and chroma sampling grid will not be visible in most cases, because in many chroma formats luma and chroma samples are not co-sited).

In conclusion, the "direct chroma processing" is preferable. In fact, upsampling and downsampling do blur the original chroma information and they are also resource demanding. On the opposite, it is relatively easy to keep the spatial relation among luma and chroma samples, particularly when "direct luma processing" has been used.

The proposed method also includes a procedure for compressing descriptions. Descriptions may be compressed using state-of-the-art lossless or lossy techniques prior transmission. It is even possible to use standard video encoders which are usually made of a prediction (e.g. motion estimation and compensation), transform (2D 8×8 DCT or multi-level DWT), adaptive scalar/vector quantization and entropy coding of quantized coefficients and auxiliary prediction signals (e.g. motion vectors).

The sequence to be compressed is made up by juxtaposition of descriptions. In order to preserve the statistic of data exploited by standard video encoders, it is preferable to juxtapose descriptions of neighboring group of pixels generated using the same coefficients. Preferably, the spatial position of the juxtaposed description will be related to the position of the group of pixels from which it has been computed.

By way of example, the picture PK of FIG. 2 can be partitioned into many non-overlapping groups G of the same size and shape. Thus the same encoding matrix M can be used for all these groups G to generate description vectors d. Each element in all description vectors $\vec{d}$ will form a different sequence to be compressed: the first element from all description vectors $\vec{d}$ will form the picture for the first sequence, the second will form the second sequence, and so on. In each sequence, the position of an element within the picture will be chosen according to the position of the group of pixels G which has generated the element.

After compression, encoded descriptions (bitstreams) can be grouped as desired. Groups of encoded descriptions can then be transmitted, in particular over one channel using proper channel sharing policies (e.g. interleaving). Alternatively and preferably, if more than one channel is available, groups of compressed descriptions can be transmitted exploiting channel diversity.

The proposed method and apparatus show several advantages. Considering for instance comparison of the proposed method and systems with multiple description coding methods involving QFE matrix multiplication: QFE matrix is combined with quantization (for encoding) and dequantization (for decoding) while in the proposed method matrix multiplication is combined with downsampling (for encoding) and upsampling (for decoding). Nevertheless, as shown previously quantization may be included in the proposed method as well.

QFE matrix generates only SNR multiple descriptions while the proposed method is mainly tailored for Spatial and/or Temporal multiple descriptions. SNR descriptions may also be generated by using the proposed method as it has been explained previously with reference to dithered descriptions; and in QFE matrix multiplication the data to be encoded are assumed to be independent, if this is not the case, the Karhunen-Loeve is eventually used to decorrelate the data. Next a correlating transform is applied with the matrix multiplication. This correlation is exploited to estimate lost data. On the opposite, in the proposed method, the dependence among data is a desirable property and it is preserved by the matrix multiplication. Particularly, spatial and temporal correlation of the data corresponding to groups of pixels (a priori statistic) are preserved. Alternatively spatial and temporal correlation is computed from received data (a posteriori statistic). Both are used to reconstruct lost data as previously detailed in describing the coupled concealment procedures and decoupled concealment procedures.

Another advantage of the proposed method lies in that it is specifically suited to generate descriptions which have a visual meaning. Generated subsequences can be compressed using standard state-of-the-art video codecs. This explains why it is worth preserving spatial and temporal correlation of the original data: standards codecs are tuned to exploit this kind of correlation to achieve compression. As a consequence, it must be noted that the proposed method withstands lossy compression. On the opposite, descriptions generated by QFE have poor visual meaning. Because of this, compressing subsequences is a very difficult task in the QFE framework. Specific procedures are required and lossless techniques have to be used.

The proposed method allows for easy implementation through equivalent banks of filters, that are useful to study the two dimensions spectrum of the generated descriptions. Standard video encoders, which may be used to compress generated description, are tuned to discard high-frequency parts of the spectrum which are believed not to be perceivable. The compression is then lossy but visually lossless.

Multiple descriptions can be tuned to ease the compression task of standard video encoders. Alternatively, video encoders can be tuned to match the statistic of generated descriptions. As an example: the quantization matrix for transformed coefficients and the zig-zag scan path can be chosen. Of course, without prejudice to the underlying principle of the invention, the details and embodiments may vary, also significantly, with respect to what has been described and shown by way of example only, without departing from the scope of the invention as defined by the annexed claims.

It must be noted that the proposed method, presenting an increased error resiliency, may render superfluous channel coding. However, the proposed method can substitute channel coding as well.

Multiple descriptions coding shows at least two advantages with respect to know channel coding techniques based on error correction codes: error correction codes are decoded only if errors are under a certain threshold, whereas multiple descriptions coding always decodes, although sometimes with a lower quality; and by using error correction codes the situation of having errors are under a certain threshold is equivalent to absence of errors, whereas multiple descriptions coding can exploit redundancy to reduce quality loss due to source coding.

Reed-Solomon codes for instance, starting from P data packets, generate D packets, with D greater than P. Such D packets contain the P data packets and redundant packets. Decoding is ensured if at least P packets are received. The proposed method can operate in the same way. The proposed method starts from a number P of pixels and generate D descriptions. D can also be greater or equal than P. Decoding is ensured if at least P descriptions are received. Thus, for instance, instead of using a channel code having a 3/2 redundancy, a multiple descriptions coding scheme can be used that generate two descriptions and add a third description.

As another example: instead of using a channel code with redundancy 5/4, a multiple descriptions coding scheme can be used that generates four descriptions and adds a fifth description.

That which is claimed is:

1. A method for encoding video signals comprising:
obtaining a pixel values vector by selecting a group of pixels in a picture of the video signal and applying a respective encoding matrix from among a plurality of different encoding matrices to the pixel values vector by using a processor, each respective encoding matrix being subdivided into a plurality of sub-matrices; and
generating a multiple descriptions vector associated with the pixel values vector and based upon a relative location and shape of the group of pixels by using the processor, the plurality of sub-matrices being for associating subsets of pixels in the group of pixels to subsets of descriptions from the multiple descriptions vector;
selecting the group of pixels in the picture of the video signal includes at least one of selecting groups of pixels comprising pixels adjacent to each other, and selecting groups of pixels partially overlapping.

2. The method of claim 1, wherein said respective encoding matrix comprises respective coefficients that are representative of respective encoding equation sets; and
wherein applying the respective encoding matrix includes implementing said respective encoding matrix through respective banks of filters having the respective coefficients as filter coefficients.

3. The method of claim 1, wherein subdividing includes applying permutations to the respective encoding matrix to obtain a block diagonal structure on said respective encoding matrix.

4. The method of claim 1, further comprising adding coefficients to the respective encoding matrix that are based on statistics of the group.

5. The method of claim 4, wherein adding coefficients is used for implementing at least one of a coupled concealment procedure and a decoupled concealment procedure.

6. The method of claim 1, further comprising a luma processing procedure including demultiplexing for interlaced video prior to applying the respective encoding matrix and by field multiplexing after applying the respective encoding matrix.

7. The method of claim 1, further comprising a chroma processing procedure including performing a chroma interpolation and a decimation of the group of pixels prior to applying the respective encoding matrix.

8. The method of claim 1, wherein generating a multiple descriptions vector includes adding descriptions for a channel coding operation.

9. The method of claim 1, wherein the multiple descriptions vector comprises at least one of spatial, temporal multiple descriptions, and signal-to-noise ratio (SNR) multiple descriptions.

10. The method of claim 1, further comprising compressing the video signals.

11. A non-transitory computer-readable medium having computer executable instructions for encoding video signals, the instructions comprising:
obtaining a pixel values vector by selecting a group of pixels in a picture of the video signal and applying a respective encoding matrix from among a plurality of different encoding matrices to the pixel values vector, each respective encoding matrix being subdivided into a plurality of sub-matrices; and
generating a multiple descriptions vector associated with the pixel values vector and based upon a relative location and shape of the group of pixels, the plurality of sub-matrices being for associating subsets of pixels in the group of pixels to subsets of descriptions from the multiple descriptions vector;
selecting the group of pixels in the picture of the video signal includes at least one of selecting groups of pixels comprising pixels adjacent to each other, and selecting groups of pixels partially overlapping.

12. A method for encoding video signals comprising:
obtaining a pixel values vector by selecting a group of pixels in a picture of the video signal and applying a respective encoding matrix from among a plurality of different encoding matrices to the pixel values vector by using a processor; and
generating a multiple descriptions vector associated with the pixel values vector the multiple descriptions vector and based upon a relative location and shape of the groups of pixels by using the processor;
the multiple descriptions vector being generated by performing a translation of the multiple descriptions vector by at least one of adding a corresponding offset vector to the respective encoding matrix, extending the respective encoding matrix, the multiple descriptions vector, and the pixel values vector, and adding variable offsets to descriptions from the multiple descriptions vector to implement a dithering directly on the descriptions;
selecting the group of pixels in the picture of the video signal including at least one of selecting groups of pixels comprising pixels adjacent to each other, and selecting groups of pixels partially overlapping.

13. The method of claim 12, wherein said respective encoding matrix comprises respective coefficients that are representative of respective encoding equation sets; and
wherein applying the encoding matrix includes implementing said respective encoding matrix through respective banks of filters having the respective coefficients as filter coefficients.

14. The method of claim 12, wherein subdividing includes applying permutations to the encoding matrix to obtain a block diagonal structure on said respective encoding matrix.

15. The method of claim 12, further comprising adding coefficients to the respective encoding matrix that are based on statistics of the group.

16. The method of claim 15, wherein adding coefficients is used for implementing at least one of a coupled concealment procedure and a decoupled concealment procedure.

17. The method of claim 12, further comprising a luma processing procedure including demultiplexing for interlaced video prior to applying the respective encoding matrix and by field multiplexing after applying the respective encoding matrix.

18. The method of claim 12, further comprising a chroma processing procedure including performing a chroma interpolation and a decimation of the group of pixels prior to applying the encoding matrix.

19. The method of claim 12, wherein generating a multiple descriptions vector includes adding descriptions for a channel coding operation.

20. The method of claim 12, wherein the multiple descriptions vector comprises at least one of spatial, temporal multiple descriptions, and signal-to-noise ratio (SNR) multiple descriptions.

21. The method of claim 12, further comprising compressing the video signals.

* * * * *

UNITED STATES PATENT AND TRADEMARK OFFICE
CERTIFICATE OF CORRECTION

| | |
|---|---|
| PATENT NO. | : 7,961,790 B2 |
| APPLICATION NO. | : 11/084531 |
| DATED | : June 14, 2011 |
| INVENTOR(S) | : Vitali et al. |

It is certified that error appears in the above-identified patent and that said Letters Patent is hereby corrected as shown below:

Column 1, Line 65     Delete: "however it is"
Insert: --however is--

Column 5, Line 17     Delete: "greater or equal than"
Insert: --greater than or equal to--

Column 6, Line 2     Delete: "$\vec{d}\,d^{\,i}$"
Insert: --$\vec{d}^{\,i}$--

Column 6, Line 47     Delete: "sub-system"
Insert: --sub-systems--

Column 8, Line 29     Delete: "where In"
Insert: --where in--

Column 8, Line 33     Delete: "pixel"
Insert: --pixels--

Column 8, Line 38     Delete: "pixel"
Insert: --pixels--

Column 8, Line 42     Delete: "pixel"
Insert: --pixels--

Column 9, Line 24     Delete: "by following"
Insert: --by the following--

Signed and Sealed this
Third Day of July, 2012

David J. Kappos
*Director of the United States Patent and Trademark Office*

| | |
|---|---|
| Column 12, Line 29 | Delete: "coefficient"<br>Insert: --coefficients-- |
| Column 12, Line 50 | Delete: "description"<br>Insert: --descriptions-- |
| Column 13, Line 4 | Delete: "uplsampling"<br>Insert: --upsampling-- |
| Column 13, Line 20 | Delete: "d"<br>Insert: $-\vec{d}-$ |
| Column 13, Line 63 | Delete: "it well"<br>Insert: --it is well-- |
| Column 14, Line 5 | Delete: "an"<br>Insert: --a-- |
| Column 14, Line 9 | Delete: "prior multiple"<br>Insert: --prior to multiple-- |
| Column 14, Line 13 | Delete: "prior multiple"<br>Insert: --prior to multiple-- |
| Column 14, Line 21 | Delete: "performed by" |
| Column 14, Line 27 | Delete: "contains informations pertaining only"<br>Insert: --contain information pertaining to only-- |
| Column 15, Line 40 | Delete: "group"<br>Insert: --groups-- |
| Column 16, Line 31 | Delete: "standards"<br>Insert: --standard-- |
| Column 16, Line 62 | Delete: "know"<br>Insert: --known-- |
| Column 16, Line 67 | Delete: "are" |
| Column 17, Line 9 | Delete: "generate"<br>Insert: --generates-- |

CERTIFICATE OF CORRECTION (continued)
U.S. Pat. No. 7,961,790 B2

Column 17, Line 10  Delete: "greater or equal than"
Insert: --greater than or equal to--

Column 17, Line 15  Delete: "generate"
Insert: --generates--

Column 18, Line 35  Delete: "the multiple descriptions vector"